United States Patent [19]

Smith

[11] 3,879,479

[45] Apr. 22, 1975

[54] PROCESS FOR PREPARING 1,2,3-TRICHLOROPROPENE

[75] Inventor: Lowell R. Smith, Chesterfield, Mo.

[73] Assignee: Monsanto Company, St. Louis, Mo.

[22] Filed: Dec. 17, 1971

[21] Appl. No.: 210,111

[52] U.S. Cl. .......................... 260/654 H
[51] Int. Cl. ............................ C07c 21/04
[58] Field of Search ................. 260/654 H

[56] References Cited
UNITED STATES PATENTS

| | | | |
|---|---|---|---|
| 2,130,084 | 9/1938 | Groll et al. | 260/654 H |
| 2,296,614 | 9/1942 | Hearne | 260/654 H |
| 3,067,266 | 12/1962 | Ranucci et al. | 260/654 H |

FOREIGN PATENTS OR APPLICATIONS 642,940   6/1962   Canada ........................ 260/654 H

*Primary Examiner*—Delbert E. Gantz
*Assistant Examiner*—Joseph A. Boska
*Attorney, Agent, or Firm*—William I. Andress; John L. Young

[57] ABSTRACT

A continuous process for producing 1,2,3-trichloropropene through further chlorination of mixtures of 2-chloropropene and 2,3-dichloropropene in vapor phase under chlorine substitution conditions.

4 Claims, No Drawings

PROCESS FOR PREPARING 1,2,3-TRICHLOROPROPENE

This invention relates to a process for producing 1,2,3-trichloropropene, a compound employed commercially as an intermediate in the manufacture of certain pesticides and other chemical products. More specifically, the invention is addressed to a continuous process for producing 1,2,3-trichloropropene by chlorinating mixtures of mono- and di-chloropropenes in vapor phase under chlorine substitution conditions.

Heretofore, 1,2,3-trichloropropene has been prepared for commercial use by first converting 2,3-dichloropropene to 1,2,-2,3-tetrachloropropane via a liquid phase chlorine addition reaction followed by a dehydrochlorination to produce the desired 1,2,3-trichloropropene. In practice, this discontinuous process requiring two reactions has been found to be unduly complicated and relatively costly to operate.

It is therefore, an object of this invention to provide a more economical and convenient process for the production of 1,2,3-trichloropropene.

It is a further object of this invention to provide a novel continuous process for producing 1,2,3-trichloropropene from mixtures of 2-chloropropene and 2,3-dichloropropene through a vapor phase halogen substitution reaction.

Considered broadly, the novel process of this invention comprises the following steps in sequence: (1) forming a liquid feed by blending 2-chloropropene with 2,3-dichloropropene; (2) converting the liquid feed to the vapor state; (3) heating the vaporous mixture to an elevated temperature; (4) admixing chlorine with the heated vapors to form a reactive mixture; (5) introducing the resulting reactive mixture into a reactor under conditions for effecting a chlorine substitution reaction; (6) cooling the reactor effluent to condense the chloropropenes present; (7) fractionally distilling the condensate to separate 1,2,3-trichloropropene from unreacted 2-chloropropene and from the 2,3-dichloropropene formed during reaction; (8) collecting the 1,2,3-trichloropropene product while returning 2-chloropropene and 2,3-dichloropropene to the first of the foregoing steps for a repetition of the process cycle.

The liquid feed mixture is obtained by blending 2-chloropropene with 2,3-dichloropropene in a weight ratio of from about 0.2:1 to 0.6:1, and preferably from about 0.4:1 to 0.5:1. The precise optimum ratio for any given operation will be dependent upon the reaction conditions to be used. That is, the ratio is selected with a view toward the amount of 2,3-dichloropropene which will be formed from the 2-chloropropene present under the contemplated reaction conditions. For efficient operation, it is important that the 2,3-dichloropropene component of the feed mixture be maintained in quantitive balance without build-up or deficit. In order to maintain a steady state of availability during the process cycles, the quantity of 2,3-dichloropropene in the exit stream of the reactor should be greater than in the inlet stream by just enough to account for losses accrued in distillation and recycling. Normally, an excess of from 2 to 3 percent will suffice to counterbalance these losses.

Depending on availability, it is generally economically advantageous to employ 2-chloropropene as the sole process raw material. In such case, 2-chloropropene is first passed through the process sequence and the 2,3-dichloropropene produced together with unreacted 2-chloropropene are then recycled to the blending zone to be mixed with additional 2-chloropropene as required.

As the liquid feed mixture is formed, it is passed to a vaporizer for conversion to the vapor phase. The mixed chloropropenes vapors are then forwarded to a preheater prior to admixture with gaseous chlorine. Since chlorine and olefinic compounds will usually react rapidly via halogen addition when brought into contact at relatively low temperatures, it is necessary, if halo-addition is to be substantially avoided, that the reactants be brought together at an elevated temperature. The preheating temperatures are not critical, it being merely necessary that they be sufficiently high to substantially obviate the occurrence of halogen addition reactions. Generally, temperatures in the range of from about 280° to 400°C. have been found satisfactory.

Following passage through the preheater, the hot chloropropene vapors are blended with chlorine to form a reactive mixture such that the weight ratio of chlorine to combined chloropropenes is in the range of from about 0.10:1 to 0.30:1; and preferably 0.20:1 to 0.25:1. The aforementioned ratios are critical to the extent that a lower relative concentration of chlorine results in a substantially reduced conversion, while a greater concentration leads to excessive decomposition of the desired product.

After the chloropropene gases have been mixed with chlorine, it is highly desirable that the reactive mixture be permitted to reach reaction temperature as soon as possible in order to keep by-product formation to the barest minimum. Thus, the gaseous mixture is introduced immediately into a reactor maintained at a temperature in the range of from about 460° to 500°C., with from about 480° to 490°C. being generally preferred. It has been found that chlorine addition reactions are substantially suppressed in favor of chlorine substitution at reaction temperatures above about 460°C. It is desirable, however, not to employ temperatures exceeding about 500°C., since decomposition and excessive production of carbonized chloropropene occurs at temperatures above this level.

The halo-substitution reaction is exothermic and considerable heat is liberated during its occurrence. It is the exothermicity of this reaction which raises the temperature of the reactive mixture from that acquired during preheating to the level desired in the reactor. In order to maintain the reactor temperature at the desired level proper automatic controls are, of course, required.

The retention time at reaction conditions should be in the range of from about 0.2 to 0.4 seconds, with from about 0.25 to 0.35 seconds being usually preferred. Residence times in the reactor of less than about 0.2 seconds results in excessive chlorine breakthrough, while time intervals exceeding about 0.4 seconds tend to cause excessive coke formation, reactor plugging, and/or flame propagation.

It is convenient to condense the entire effluent from the reactor, excepting the hydrogen chloride formed and unreacted chlorine, if any, by passing the effluent to a condenser cooled below the boiling point of the lowest boiling chloropropene reactant. The hydrogen chloride formed in the reaction and the unreacted chlorine are allowed to pass through the condenser and to a scrubber for collection or disposal.

In a final operation, the condensate from the condenser is fractionally distilled to separate the 1,2,3-trichloropropene from unreacted 2-chloropropene, the 2,3-dichloropropene formed during reaction and various reaction by-products in small quantity. The 1,2,3-trichloropropene is collected as product and the 2-chloropropene and 2,3-dichloropropene are returned to the initial process step for recycling through the process.

As is apparent, a significant advantage provided by the process of this invention is a capability for the direct conversion of raw materials to the desired 1,2,3-chloropropene product by a reaction which is readily adaptable to continuous operation. Also, the production of undesired by-products is limited to less than about 10 percent of the total product.

The following example will serve to illustrate a specific embodiment of the invention.

EXAMPLE

A liquid feed mixture was prepared by blending 2-chloropropene (185 lbs., 24.2 gals.) with 2,3-dichloropropene (423 lbs., 42.3 gals.) to form a blend of 2-chloropropene and 2,3-dichloropropene in a weight ratio of 0.44:1, respectively. The liquid feed was vaporized and passed through an electrically heated preheater tube where the temperature of the mixture was raised to approximately 350°C. The hot vapors from the preheater were then intimately mixed with chlorine (149 lbs.) to form a reactive admixture having a weight ratio of 0.245:1 (chlorine: combined chloropropenes). This chlorine containing mixture was immediately fed to an insulated reactor maintained at 480°C. for a residence time of 0.3 seconds.

The reactor containing a temperature controller set at 480°C. was spherical in shape with an exit to a condenser in the bottom hemisphere and an entrance jet protruding at about the center of the sphere. A thermocouple was placed in the exit and was used to control the preheater temperature for maintenance at about 350°C. The exothermicity of the reaction caused a temperature rise in the reactor to the permitted 480°C. from the incoming charge temperature of about 350°C.

Following reaction, the reactor effluent was passed to a condenser allowing the hydrogen chloride formed and unreacted chlorine to pass through to a scrubber. Upon analysis the condensate (679 lbs.) was found to have the following approximate composition:

| COMPOUND | WEIGHT % |
| --- | --- |
| 2,3-dichloropropene | 62.5 |
| 2-chloropropene | 13.3 |
| cis-1,2,3-trichloropropene | 8.3 |
| trans-1,2,3-trichloropropene | 6.7 |
| by-product mixture | 9.2 |

After an atmospheric distillation of the condensate through a 20 plate column, 101 lbs. of 1,2,3-trichloropropene product was collected in the fraction coming off at a vapor temperature between 130° and 150°C. At vapor temperatures up to 125°C., there was recovered 518 lbs. of a low low-boiling fraction having the following approximate composition.

| COMPOUND | WEIGHT % |
| --- | --- |
| 2-chloropropene | 17.1 |
| 1,2-dichloropropene | 1.1 |
| 2,3-dichloropropene | 80.4 |
| 1,2,2-trichloropropane | 0.8 |
| 2,3,3-trichloropropene | 0.6 |

This low-boiling distillate was blended with 93 lbs. of 2-chloropropene to form a mixture of 2-chloropropene and 2,3-dichloropropene in a weight ratio of 0.44:1, which was recycled through the process.

The invention claimed is:

1. A continuous process for producing 1,2,3-trichloropropene which comprises:
   1. heating a mixture of 2-chloropropene and 2,3-dichloropropene in a weight ratio of from 0.2:1 to 0.6:1, respectively, to above its vaporization temperature,
   2. admixing said mixture with chlorine in an amount whereby the weight ratio of chlorine to the mixture of chloropropenes is from 0.10:1 to 0.30:1,
   3. maintaining the admixture of (2) at a temperature of from about 460° to 500°C. for from about 0.2 to 0.4 seconds, whereby 1,2,3-trichloropropene is formed and a portion of the 2-chloropropene and 2,3-dichloropropene remains,
   4. separating the 1,2,3-trichloropropene from the 2-chloropropene and 2,3-dichloropropene,
   5. recycling the 2-chloropropene and 2,3-dichloropropene as components in the mixture of (1).

2. The process of claim 1, wherein the weight ratio of 2-chloropropene and 2,3-dichloropropene in the mixture of (1) is from 0.4:1 to 0.5:1, respectively.

3. The process of claim 1, wherein said weight ratio of chlorine to the mixture of chloropropenes is from 0.20:1 to 0.25:1.

4. The process of claim 1, wherein the admixture of (2) is maintained at from 480° to 490°C. for from 0.25 seconds to 0.35 seconds.

* * * * *